United States Patent
Marwell et al.

[11] 3,863,154
[45] Jan. 28, 1975

[54] SWITCHED INTEGRATOR

[75] Inventors: Edward M. Marwell, Mount Kisco; Eugene P. Finger, Brewster, both of N.Y.

[73] Assignee: Curtis Instruments, Inc., Mount Kisco, N.Y.

[22] Filed: Jan. 22, 1973

[21] Appl. No.: 325,749

Related U.S. Application Data

[63] Continuation-in-part of Ser. No. 275,329, July 16, 1972, Pat. No. 3,777,266.

[52] U.S. Cl. ............................ 324/182, 324/76 A
[51] Int. Cl. ........................................... G04f 9/00
[58] Field of Search ................. 324/182, 94, 76 A

[56] References Cited
UNITED STATES PATENTS
3,718,861  2/1973  Ramsey ........................ 324/94 X Primary Examiner—Alfred E. Smith
Assistant Examiner—Rolf Hille
Attorney, Agent, or Firm—Pennie & Edmonds

[57] ABSTRACT

A method and apparatus is disclosed for measuring the operational use of a physical system. The apparatus includes an integrator having a reversible coulometer, including a bored tube made of transparent or translucent material with a pair of electrodes connected to each side thereof. A transparent electrolyte is positioned in the bore between two columns of an opaque electrolytically platable metal. A pair of light sensitive elements, spaced from one another, are positioned on one side of the tube and a source of light is positioned on the opposite side of the tube. A source of current is intermittently connected to the electrodes of the coulometer such that current passes through the coulometer only when the system being measured is in use. A single logic input is provided which controls the direction of current flow through the coulometer and which energizes a warning device when a fault condition has occurred.

After a predetermined quantity of charge has passed through the coulometer, the electrolytic gap will become positioned in a line between the source of light and one of the light sensitive elements. When this occurs, an output is generated which energizes a warning device which indicates that maintenance or servicing of the physical system is required.

9 Claims, 1 Drawing Figure

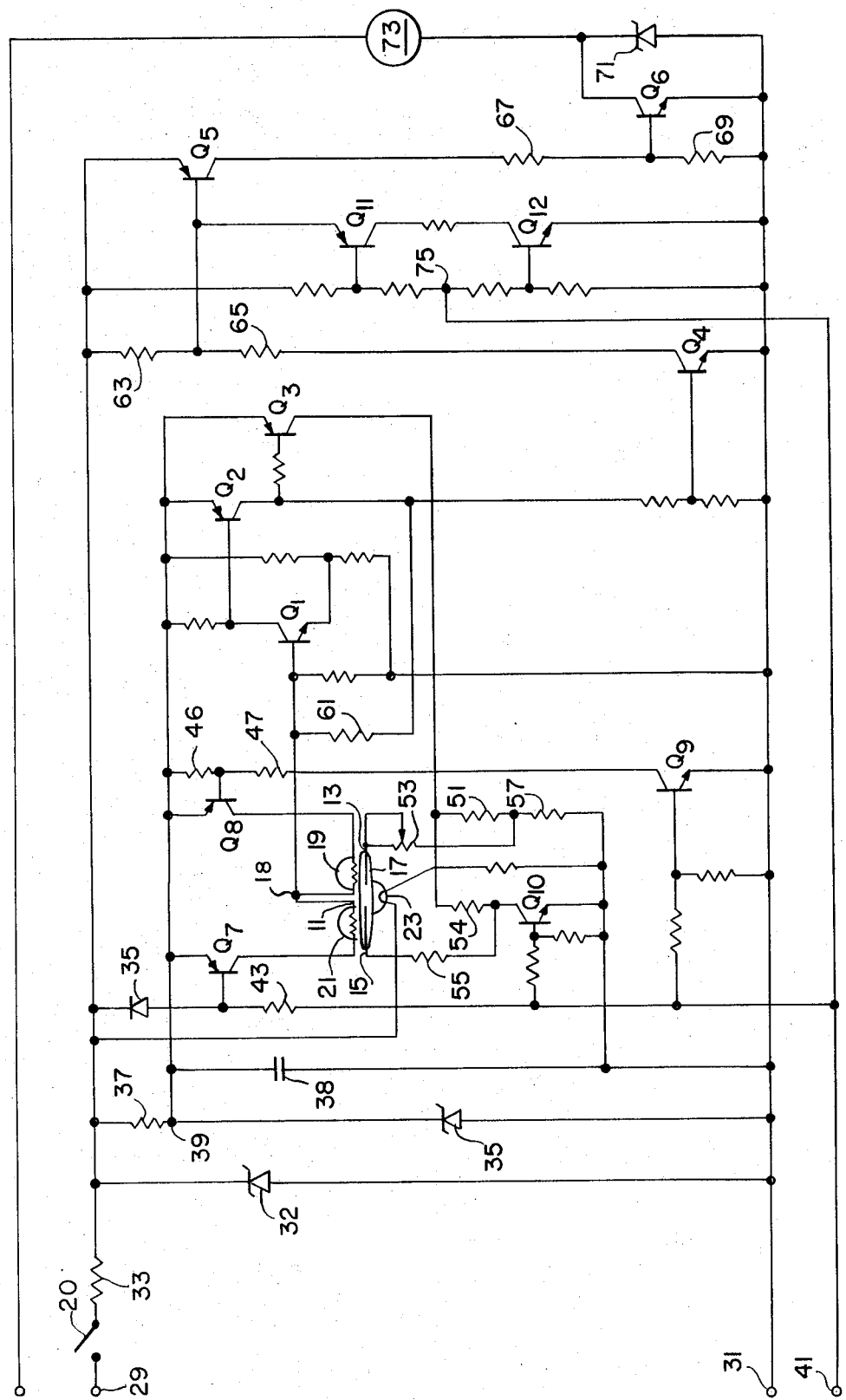

SWITCHED INTEGRATOR

BACKGROUND OF THE INVENTION

This invention is a continuation-in-part of copending patent application Ser. No. 275,329, filed July 16, 1972, and titled "Programmable Integrator," now U.S. Pat. No. 3,777,266 and relates to a method and apparatus for measuring the use of a system or a portion thereof.

With the increased complexity of electrical and mechanical systems, such as motor vehicles, computers, airplanes, and other such sophisticated equipment, which operate on either a continuous or intermittent basis and which require preventive maintenance, the necessity of measuring the total length of time that the system has been in use and, equally important, the degree or level of such use has become increasingly important. For example, in the past, the use of machines, such as motor vehicles, was measured on a rather crude basis, that is, by means of an odometer. Such a measuring device indicates the total mileage traveled by the vehicle but fails to accurately show the level of use of the vehicle. Thus, if the motor vehicle is normally operated in heavy commuter traffic, the time during which the engine is running cannot be adequately gauged by the number of miles the car has traveled since a large portion of the operating time may have occurred while the vehicle is in an idle state or moving at a slow pace. Because the odometer is not an accurate means for measuring the operational use of motor vehicles, manufacturers now recommend that the time for motor vehicle service be based on two criteria, namely, the number of miles traveled by the vehicle and the expiration of a predetermined time interval. Neither of these criteria accurately reflect the use of a vehicle. Accordingly, with the increased complexity of motor vehicles due to fuel emission and safety requirements, a more accurate technique is needed for determining the use of such vehicles.

In other technological systems, preventive maintenance, such as lubrication and periodic parts replacement, is required. If the operational use of these systems can be adequately determined, the appropriate time for maintenance can be more precisely determined. This will result in a substantial economy of use of the vehicle since the device will be serviced only at intervals determined by machine usage.

Many mechanical and electrical timers and operating cycle timers are presently commercially available, but they are typically too large and expensive to be incorporated into machines or machine subassemblies. Others, such as the programmable integrator disclosed in copending application Ser. No. 275,329, include rather sophisticated means for measuring the use of a physical system by monitoring a number of components of the system, weighing the contributions of each component to overall system use, and then determining the total use of the system.

There is now a need, however, for a simplified but accurate use determining means which may be easily installed in a vehicle or other such apparatus and which cannot be easily tampered with by an unauthorized person.

It, therefore, is an object of this invention to provide a method and apparatus for measuring the operational use of a physical system, which apparatus may be easily attached to the system it measures and which cannot be easily disconnected by unauthorized personnel.

SHORT STATEMENT OF THE INVENTION

Accordingly, this invention relates to a method and apparatus for determining the use of a physical system. The apparatus includes an integrator including a reversible coulometer having a bored tube made of a nonconductive, transparent or translucent material through the ends of which extend a pair of electrodes. An opaque liquid metal capable of being electrolytically deposited is placed inside a tube in contact with the electrodes with the metal being separated by a gap filled with a transparent electrolyte. A pair of light sensitive elements spaced from one another are positioned to one side of the tube, and a source of light is situated on the opposite side of the tube. A source of current, such as the battery of a car, is intermittently connected to the coulometer through a switch, such as an ignition switch, which is closed only during the time the vehicle is in operation. A single logic input is provided which controls the direction of current flow through the coulometer and which controls a logic circuit which indicates when a fault condition has occurred, i.e., when the logic input becomes disconnected.

In operation, with the logic input connected to a low potential, such as ground, the coulometer integrates the current flowing therethrough from the battery source until the electrolytic gap intercepts the path of light directed to one of the light sensitive resistors. When this occurs, an output switch is closed thereby permitting current flow through a warning device which indicates that maintenance or servicing is required. After servicing, the logic input is then connected to a high potential, such as battery potential. The current path to the coulometer is thereby reversed so that the coulometer integrates the current conducted therethrough in the opposite direction. At the end of the integrating interval, the warning device is again energized to indicate that servicing is again required. This process of reversing the direction of current conduction through the coulometer at the end of each integrating interval, i.e., servicing interval, continues throughout the life of the vehicle. If the logic input should become disconnected for whatever reason, a logic circuit is provided which energizes the warning device to indicate that a fault condition has occurred.

BRIEF DESCRIPTION OF THE DRAWINGS

Other objects, features, and advantages of the invention will become more fully apparent from the following detailed description appended claims, and the accompanying drawing which is a schematic diagram of the programmable integrator of this invention.

DETAILED DESCRIPTION OF THE PREFERRED EMBODIMENT

Referring to the FIGURE, the programmable integrator circuit of this invention is shown having a coulometer 11 therein illustrated schematically. The coulometer includes a pair of electrodes 13 and 15 secured to a tube 17 at each end thereof. As more completely described in U.S. Pat. No. 3,462,684 issued to Curtis Beusman and assigned to the common assignee herewith, the coulometer tube has a bore therethrough into which a platable liquid metal, such as mercury, is positioned. The mercury is formed in two columns which are separated by a suitable electrolyte. The electrolyte and tube are either transparent or translucent while the liquid metal is opaque. As is known in the art, the gap between the mercury columns formed by the electrolyte will move toward one of the electrodes when current is conducted through the coulometer. The direction and rate of movement of the gap depends upon the direction and level of current flow through the coulometer. A pair of light sensitive elements 19 and 21 are positioned to one side of the coulometer tube 17 and are spaced from one another along the longitudinal axis of the tube. The light sensitive elements may be of any suitable type, such as, for example, photocells or phototransistors, but in the preferred embodiment, photocells are utilized. A source of light 23 is positioned on the side of the tube 17 opposite the elements 19 and 21. The light source may include one or more suitable radiation devices, such as a lamp or a photodiode, as well as ambient light. The light source is connected to a source of voltage which may be, for example, the battery of a car.

The circuit associated with the integrator is connected to a source of potential, such as the battery of a motor vehicle, via a switch 20 at terminals 29 and 31. The switch 20 may be an ignition switch if the integrator is to measure the use of an engine or may be any other suitable device which closes when the system being measured is in operation. A coarse shunt regulator in the form of a zener diode 32 is connected in series with a small 2-watt resistor 33 across the battery to regulate the voltage across lamp 23, and to absorb positive and negative voltage transients caused by the ignition system. A second regulator including a zener diode 35 is connected to the input source of voltage via a current supply resistor 37. A capacitor 38 is connected across the diode 35 to smooth out any transient ripples which might occur and to suppress stray noise signals. Thus, the voltage at junction 39 serves as the supply potential for the circuitry which controls the operation of the coulometer 17.

A first PNP transistor Q7 is connected between junction 39 and photo detector 21. A second PNP transistor Q8 is connected between junction 39 and photo detector 19. The base terminal of transistor Q7 is connected to the logic input terminal 41 via a biasing resistor 43 and is connected to resistor 33 via a diode 35. The base of transistor Q8 is connected to the collector terminal of transistor Q9 via a resistor 47 and is connected to junction 39 via a biasing resistor 46. The emitter terminal of transistor Q9 is connected to ground. The base of transistor Q9 is connected to the logic input terminal 41 so that when the logic input is at a high potential, such as battery potential, NPN transistor Q9 is turned on. When this occurs, the voltage at the base of transistor Q8 goes negative thereby turning transistor Q8 on so that terminal 39 is effectively connected to one side of photocell 19. On the other hand, when the input at terminal 41 is low, e.g., ground potential, transistor Q9 and hence, transistor Q8 is turned off. At the same time, the potential at the base of transistor Q7 goes in a negative direction thereby turning on transistor Q7 to effectively connect terminal 39 with photo detector 21.

The output terminal 18 of the photocells 19 and 21 which is common to both is connected to both the base terminal of transistor Q1 and the base terminal of transistor Q3. As illustrated, transistor Q3 is connected in circuit with a current direction control transistor Q10 via resistor 54. The base terminal of the transistor Q10 is connected to the logic input 41 and is controlled thereby, as will be described hereinbelow. Transistor Q3 is also connected via resistor 55 to terminal 15 of the coulometer and via resistors 51 and 53 to terminal 13 of the coulometer. Resistor 53 controls the level of current conducted through the coulometer and, hence, establishes the integration interval thereof. Thus, knowing the voltage between junction 39 and ground terminal 31, resistor 53 can be suitably adjusted to control the length of time required for the electrolytic gap to travel from a position proximate one photo detector to a position in line with the light source and the other photo detector.

When the photocells are both in a high resistance state, that is, when no light passes from the light source 23 through the coulometer 11 to either photocell, transistor Q1 is turned off and transistor Q3 is turned on. Thus, current flows from junction 39 through the transistor Q3 to one of the terminals 13 or 15 of the coulometer depending upon the state of conduction of transistor Q10. Transistor Q10 is biased on when the logic input 41 is high and is turned off when the logic input is low. Thus, for example, when the logic input is high, current flows from node 39 through transistor Q3, resistor 51, variable resistor 53 to terminal 13 of coulometer 11. The current is conducted through the coulometer to the coulometer terminal 15 and then through transistor Q10 to ground.

When the logic input is low, transistor Q10 is turned off. Thus, current flows from junction 39 through transistor Q3, resistor 54, and resistor 55 to the terminal 15 of the coulometer 11. The current then passes through the coulometer to terminal 13, and then through resistor 53 and resistor 57 to ground. It can, therefore, be seen that current flow through the coulometer is dependent upon the state of conduction of transistor Q10 which, in turn, is dependent upon the logic input at terminal 41.

Assume that the logic input is high and, therefore, that transistor Q10 is turned on. Current will pass through the coulometer from terminal 13 toward terminal 15. The electrolytic gap will then move from a position proximate photocell 21 toward photocell 19. After a predetermined quantity of charge, i.e., coulombs, has been conducted through the coulometer, the electrolytic gap will become positioned in a line between light source 23 and photocell 19. When this occurs, the resistance of photocell 19 is decreased thereby increasing the voltage at the base terminal of transistor Q1 and at the base terminal of transistor Q3. NPN transistor Q1 is thereby turned on which, in turn, causes the voltage at the base of transistor Q2 to go negative with respect to the emitter thereof. Hence, transistor Q2 is turned on. With transistor Q2 turned on, the potential at the base of transistor Q3 goes even higher thereby turning it off so that no further current will pass through the coulometer. The electrolytic gap will then remain positioned between the light source 23 and the photocell 19. Resistor 61 acts as a positive feedback resistor in that it couples the positive voltage at the collector of transistor Q3 to the base of transistor Q1 to further drive transistor Q1 into conduction.

With transistor Q2 conducting, the voltage at the base of transistor Q4 goes positive with respect to the emitter terminal thereof, hence transistor Q4 is turned on. With transistor Q4 turned on, current is conducted through resistors 63 and 65 to thereby turn on PNP transistor Q5 since the base terminal of the transistor goes negative with respect to the emitter thereof. With transistor Q5 turned on, current is conducted from the battery through resistor 67 and resistor 69 to ground. The current flow through resistors 67 and 69 biases power transistor Q6 on so that current is conducted from the battery through an indicator 73, such as a warning lamp and the transistor to ground. The warning lamp may be appropriately positioned for viewing. A zener diode 71 is connected across the emitter-collector terminal of transistor Q6 and serves to protect the transistor from transient voltage spikes.

Energization of the warning lamp indicates that it is time for the engine to be serviced. At the time of servicing the engine, the logic input 41 is connected to a suitable terminal which is at a logical potential opposite the previous potential at the logic input. Thus, if terminal 41 was previously connected to a high potential, it would now be connected to a low potential, such as ground and vice versa. Now assume that terminal 41 is connected to ground. A low voltage at terminal 41 biases transistors Q9 and Q10 off and turns transistor Q7 on. Because transistor Q9 is turned off, the voltage at the base of transistor Q8 rises and transistor Q8 is also shut off. Thus, photocell 21 is effectively connected to the supply voltage at junction 39 and photocell 19 is disconnected therefrom. Because transistor Q8 is shut off while transistor Q7 is turned on, the voltage at the base of transistor Q1 decreases, thereby turning that transistor off. Since transistor Q1 stops conducting current, transistor Q2 is turned off. This causes the voltage at the base of transistor Q3 to decrease, thereby turning on transistor Q3. In addition, when transistor Q2 is turned off, transistors Q4, Q5 and Q6 are also turned off thereby deenergizing the warning lamp 73.

As current passes through the coulometer 17, the electrolytic gap therein moves from a position proximate photocell 19 toward photocell 21. After a predetermined quantity of charge has passed through the coulometer, the gap becomes positioned between the source of light 23 and photocell 21. When this occurs, the voltage at the base terminals of transistors Q1 and Q3 goes positive thereby turning on transistor Q1 and turning off transistor Q3. Thus, current is prevented from passing through the coulometer so that the electrolytic gap remains positioned between light source 23 and photocell 21. At the same time, transistors Q2, Q4, Q5, and Q6 are turned on thereby energizing the warning lamp 73. It can be seen that, under normal operation, the coulometer integrates the current passing therethrough which current is conducted only when the engine is in operation. The coulometer, therefore, gives an accurate indication of engine operating time.

In order to forestall required maintenance, the logic input 41 may become disconnected from either ground potential or the positive battery potential. If this should happen, the potential at junction 75 will float to approximately one-half the battery voltage level. Logic transistor Q11 is thereby biased on since its base goes negative with respect to its emitter; the emitter being connected to the battery via the base-emitter diode of transistor Q5. In addition, transistor Q12 is biased on since its base goes positive with respect to its emitter. Thus, with both transistor Q11 and Q12 turned on, the base terminal of transistor Q5 goes negative with respect to the emitter thereof thereby turning on transistor Q5. With transistor Q5 turned on, power transistor Q6 is turned on thereby causing the warning lamp to be energized. It can, therefore, be seen that the logic circuit which includes transistors Q11 and Q12 functions to cause the warning lamp to be energized when the logic input becomes disconnected. When the logic input is connected properly to a low potential or to battery potential, transistor Q11 is turned on or off, respectively and transistor Q12 is turned off or on, respectively. Thus, under normal operating conditions, the logic circuit will not operate to turn transistors Q5 and Q6 on.

Terminals 29 and 31 are connected to the battery and ground, respectively, via a suitable integral component of the system so that the circuit cannot be disconnected without incapacitating the entire system. This can be suitably accomplished by known techniques in art.

While the preferred embodiments of the invention has been shown and described, it will be understood that the invention may be embodied otherwise than as herein illustrated and described and that certain changes in the form and the arrangement of the parts and in the specific manner of practicing the invention may be made without departing from the spirit of the invention as defined by the appended claims.

What is claimed is:

1. A programmable integrator for measuring the use of a system comprising:
   an integrator including a coulometer having a bored tube; a pair of columns of electrolytically platable metal positioned in the bore of said tube, said columns being separated by a gap filled with an electrolyte; and a pair of electrodes at each end of said tube in contact with said metal columns;
   a source of light positioned to one side of said tube;
   a pair of light sensitive means positioned on the side of said tube opposite said light source, said light sensitive means being spaced from one another along the longitudinal axis of said tube;
   switch means for connecting said coulometer across a source of voltage, said switch being closed when said system is in operational use;
   logic input means for effectively reversing the connection of said coulometer with said voltage source at the start of each of a succession of integrating intervals, said integrating interval being completed when said gap moves from a position between said light source and one of said light sensitive means to a position between said light source and the other light sensitive means, said logic input means being alternately connected to a source of high and low potential during successive integrating intervals;
   means connected to said logic input means for indicating when said logic input means is connected to neither said high or low potential sources;
   output means for indicating when said integrating interval is completed, said integrating interval representing a predetermined period of operational use of said system; and
   means controlled by said logic input means for effectively connecting to said indicating means at the beginning of an integrating interval the light sensitive means at the opposite end of the coulometer tube from the electrolytic gap.

2. The integrator of claim 1 wherein said logic input means for effectively reversing the connection of said coulometer with said voltage source further comprises means for effectively connecting one of said light sensitive means to said output indicating means, the resistance of said light sensitive means being varied when said light from said light source impinges thereon.

3. The integrator of claim 1 wherein said logic input means comprises means for preventing further movement of said electrolytic gap in said tube when said gap intercepts the path of light between said light source and said effectively connected light sensitive means.

4. A programmable integrator for measuring the use of a system comprising:
an integrator including a coulometer having a bored tube; a pair of columns of electrolytically platable metal positioned in the bore of said tube, said columns being separated by a gap filled with an electrolyte; and a pair of electrodes at each end of said tube in contact with said metal columns;
first and second means, spaced from one another along the longitudinal axis of said tube, for detecting the presence of the electrolytic gap when it is adjacent a detecting means;
means for connecting said coulometer across a source of electrical energy;
means for effectively reversing the connection of said coulometer with said electrical energy source at the start of each of a succession of integrating intervals, said integrating interval being completed when said gap moves from a position adjacent one of said first and second detecting means to a position adjacent the other of said detecting means;
output means for indicating when said integrating interval is completed, said integrating interval representing a predetermined period of operational use of said system; and
means distinct from said reversing means for preventing further movement of said electrolytic gap in said tube between the time said gap moves into a position adjacent one of said detecting means and the time the connection of said coulometer is reversed.

5. The integrator of claim 4 wherein during successive integrating intervals said reversing means is connected to a source of a first potential and a second potential, respectively, said first and second potentials being different, said integrator further comprising means connected to said reversing means for indicating when said reversing means is connected to neither said first or second potential.

6. The integrator of claim 4 wherein the means for preventing further movement of the electrolytic gap comprises a switch means effectively connected to one of said first and second detecting means, said switch stopping current flow through the coulometer when the electrolytic gap is detected by the detecting means to which said switch is effectively connected.

7. The integrator of claim 6 further comprising means controlled by said reversing means for effectively connecting to said switch means at the beginning of an integrating interval the detecting means at the opposite end of the coulometer tube from the electrolytic gap.

8. A programmable integrator for measuring the use of a system comprising:
an integrator including a coulometer having a bored tube; a pair of columns of electrolytically platable metal positioned in the bore of said tube, said columns being separated by a gap filled with an electrolyte; and a pair of electrodes at each end of said tube in contact with said metal columns;
first and second means, spaced from one another along the longitudinal axis of said tube, for detecting the presence of the electrolytic gap when it is adjacent a detecting means;
means for connecting said coulometer across a source of electrical energy;
logic input means for effectively reversing the connection of said coulometer with said electrical energy source at the start of each of a succession of integrating intervals, said integrating interval being completed when said gap moves from a position adjacent one of said first and second detecting means to a position adjacent the other of said detecting means, said logic input means being connected during successive integrating intervals to a source of a first potential and a second potential, respectively, said first and second potentials being different;
output means for indicating when said integrating interval is completed, said integrating interval representing a predetermined period of operational use of said system; and
means connected to said logic input means for indicating when said logic input means is connected to neither said first or second potential.

9. A programmable integrator for measuring the use of a system comprising:
an integrator including a coulometer having a bored tube; a pair of columns of electrolytically platable metal positioned in the bore of said tube, said columns being separated by a gap filled with an electrolyte; and a pair of electrodes at each end of said tube in contact with said metal columns;
first and second means, spaced from one another along the longitudinal axis of said tube, for detecting the presence of the electrolytic gap when it is adjacent a detecting means;
means for connecting said coulometer across a source of electrical energy;
logic input means for effectively reversing the connection of said coulometer with said electrical energy source at the start of each of a succession of integrating intervals, said integrating interval being completed when said gap moves from a position adjacent one of said first and second detecting means to a position adjacent the other of said detecting means;
means for indicating when a fault has occurred in said logic input means; and
output means for indicating when said integrating interval is completed, said integrating interval representing a predetermined period of operational use of said system.

* * * * *